United States Patent
Vath et al.

(10) Patent No.: US 9,160,266 B2
(45) Date of Patent: Oct. 13, 2015

(54) METHOD AND DEVICE FOR DAMPING TORSIONAL OSCILLATIONS

(75) Inventors: Andreas Vath, Leidersbach (DE); Tobias Herrmann, Aschaffenburg (DE); Hanno Saettler, Würzburg (DE)

(73) Assignee: Robert Bosch GmbH, Stuttgart (DE)

( * ) Notice: Subject to any disclaimer, the term of this patent is extended or adjusted under 35 U.S.C. 154(b) by 473 days.

(21) Appl. No.: 13/517,029

(22) PCT Filed: Dec. 9, 2010

(86) PCT No.: PCT/EP2010/007497
§ 371 (c)(1),
(2), (4) Date: Oct. 1, 2012

(87) PCT Pub. No.: WO2011/072820
PCT Pub. Date: Jun. 23, 2011

(65) Prior Publication Data
US 2013/0015658 A1    Jan. 17, 2013

(30) Foreign Application Priority Data
Dec. 19, 2009   (DE) .......................... 10 2009 059 669

(51) Int. Cl.
*F03D 7/02*   (2006.01)
*H02P 9/10*   (2006.01)
*F03D 11/02*   (2006.01)
*H02P 101/15*   (2015.01)

(52) U.S. Cl.
CPC ............. *H02P 9/105* (2013.01); *F03D 7/0296* (2013.01); *F03D 11/02* (2013.01); *F05B 2260/96* (2013.01); *H02P 2101/15* (2015.01); *Y02E 10/722* (2013.01); *Y02E 10/723* (2013.01)

(58) Field of Classification Search
CPC ...................................................... F03D 7/0296
USPC ....................................................... 290/44, 55
See application file for complete search history.

(56) References Cited

U.S. PATENT DOCUMENTS

| | | | |
|---|---|---|---|
| 7,173,399 B2 * | 2/2007 | Sihler et al. ..................... | 322/40 |
| 7,423,411 B2 * | 9/2008 | Sihler ............................. | 322/19 |
| 7,501,786 B2 | 3/2009 | Yasui et al. | |
| 7,501,798 B2 * | 3/2009 | Laubrock et al. ............... | 322/32 |
| 8,080,891 B2 * | 12/2011 | Schramm et al. ............... | 290/44 |

(Continued)

FOREIGN PATENT DOCUMENTS

| DE | 103 09 670 A1 | 9/2004 |
|---|---|---|
| DE | 10 2007 019 907 A1 | 10/2008 |

(Continued)

OTHER PUBLICATIONS

International Search Report corresponding to PCT Application No. PCT/EP2010/007497, mailed Apr. 26, 2012 (German and English language document) (7 pages).

*Primary Examiner* — Tho D Ta
(74) *Attorney, Agent, or Firm* — Maginot, Moore & Beck LLP

(57) ABSTRACT

A method for damping torsional oscillations in a power production plant includes a drive train, a rotor fitted to a rotor-side end of the drive train, and a generator driven via the drive train and fitted to a generator-side end of the drive train. By using at least one angular position of the drive train at the generator-side end thereof, a torsional moment acting on the drive train is determined and used to control the generator.

11 Claims, 5 Drawing Sheets

(56) References Cited

U.S. PATENT DOCUMENTS

| | | |
|---|---|---|
| 2006/0244425 A1 | 11/2006 | Sihler |
| 2008/0067815 A1 | 3/2008 | Suryanarayanan et al. |
| 2009/0025467 A1 | 1/2009 | Suzuki et al. |
| 2014/0375055 A1* | 12/2014 | Moerbe et al. .................. 290/44 |

FOREIGN PATENT DOCUMENTS

| | | |
|---|---|---|
| EP | 1 507 331 A2 | 2/2005 |
| EP | 1 714 809 B1 | 4/2009 |
| JP | 1 060286 A | 3/1989 |

* cited by examiner

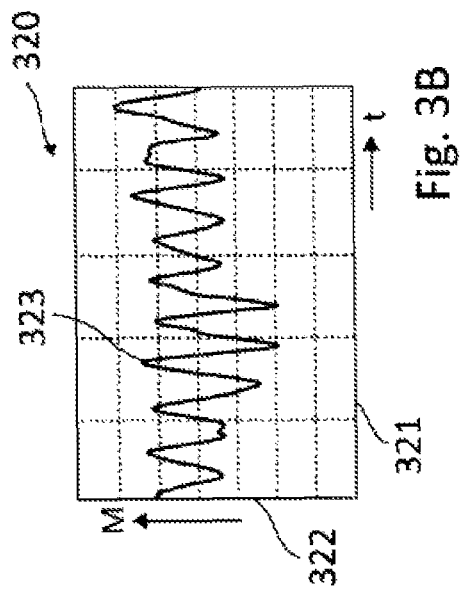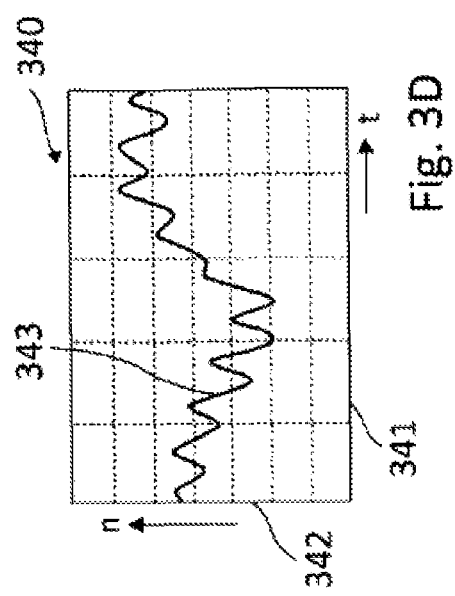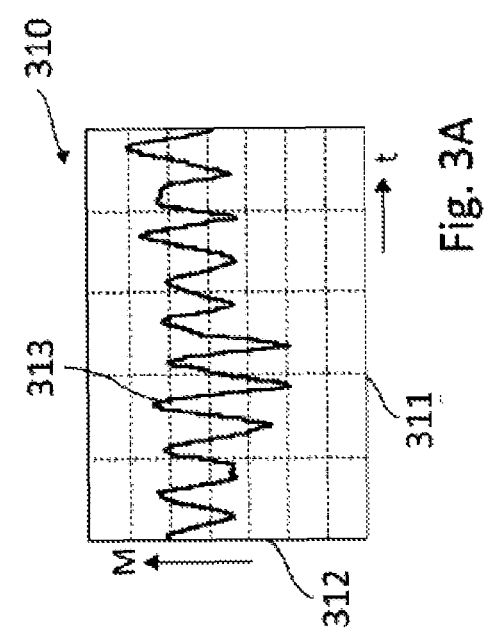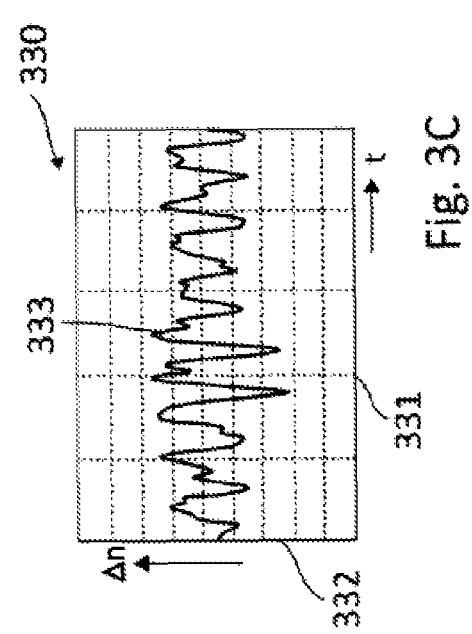

METHOD AND DEVICE FOR DAMPING TORSIONAL OSCILLATIONS

This application is a 35 U.S.C. §371 National Stage Application of PCT/EP2010/007497, filed on Dec. 9, 2010, which claims the benefit of priority to Serial No. DE 10 2009 059 669.0, filed on Dec. 19, 2009 in Germany, the disclosures of which are incorporated herein by reference in their entirety.

BACKGROUND

The disclosure relates to a method for damping torsional vibrations, in particular in the drive train of energy generation installations, by means of closed-loop generator control and a device for implementing the method.

Drive trains comprising components such as gears, clutches and connecting elements (shafts), for example, are important parts of various electrical energy generation installations, such as, for example, wind energy installations, water power installations, etc.

The drive train performs the task of producing a mechanical connection between an input drive (for example a rotor of a wind energy installation) and an output drive (for example a corresponding generator), via which energy is transmitted by a rotary movement. Drive train components, such as gears, serve the purpose of converting the speed and the torque present at the input drive to values which correspond to the working range of the generator. If required, clutches are used for isolation between the input drive and the output drive and shafts produce the mechanical connection between the components involved. Other components, such as mechanical brakes or the like, can also be integrated in the drive train.

Since the components involved cannot be manufactured with any desired stiffness, but have a finite stiffness, they can be excited to produce natural vibrations. Such excitation can take place, for example, as a result of an input power which is not constant (in the case of wind energy installations, for example, as a result of gusts of wind or wind turbulences), as a result of external faults or as a result of self-motions of other installation components. Vibrations of a different origin can also result in vibrations in the drive train, in the case of a wind energy installation, for example, vibrations of the tower or vibrations as a result of meshing of a gear.

Vibrations have a disadvantageous effect on the life of the components involved, in particular the gear. Continuous pulsating loads increase the wear on the affected component parts and result in shorter replacement intervals, which has financial and technical implications for the installation and grid operator and reduces the installation's profits. In particular from the point of view of the predicted increase in the prevalence of wind energy installations in the offshore sector in the foreseeable future, this aspect will play an ever greater role since the replacement of damaged components will be even more difficult there. The aim is therefore to reduce these vibrations in order to extend the life of the components.

Although the present disclosure in the context of this application is described primarily with respect to wind energy installations, it is in no way restricted to wind energy installations or devices for energy generation, but can be used in principle in all devices in which torsional vibrations of shafts, spindles or the like, in particular also of shafts and spindles with interposed gears, can occur.

In order to avoid vibrations, it is known to configure the generator of an energy generation installation such that it can be adjusted by means of external actuating signals. In this case, the generator may be a double-fed asynchronous generator, for example, which is connected directly to the power supply system on the stator side and is supplied on the armature side via a DC voltage intermediate circuit, as a result of which voltages and currents of different frequencies and amplitudes can be impressed on the armature. Synchronous generators which are connected to the power supply system via converters with a DC intermediate circuit and are correspondingly adjustable are also used in the prior art. By virtue of the mentioned actuation possibilities, it is possible for the generator to be provided with a torque which is matched to the damage-causing vibrations, as a result of which it reduces these vibrations and correspondingly damps the torque present in the drive train.

Thus, DE 10 2007 019 907 B4 has disclosed a method which forms a control deviation on the basis of the generator speed via a vibrational delay element, from which a correction torque is determined for open-loop generator control.

A similar approach is pursued in US 2008/0067815, in accordance with which a signal is generated from changes in the generator speed, and this signal is used to realize damping via the generator actuating torque.

EP 1 507 331 A2 describes a method in which a generator actuating torque is generated from the generator speed specifically for synchronous generators.

Disadvantages with all of these solutions are considered to be the fact that the damage-causing vibrations of the torque are only determined with restricted accuracy and accordingly also the quality of the compensation operations is limited. In particular, the determination of the vibrations from the speed is subject to considerable inaccuracies.

By virtue of filtering the speed signal, this problem can be partially eliminated, but this increases the complexity in respect of damping and can result in further undesirable side effects, such as phase shifts of the signals.

U.S. Pat. No. 7,173,399 B2 has proposed, in this regard, measuring the torque via torque sensors and generating a corresponding actuating torque via load-commutated converters and current intermediate circuits. Instead of deriving an actuating torque from the speed, therefore, the torque itself is used directly, as a result of which the accuracy of the damping is improved. However, in this case the use of at least one further sensor is necessary in order to detect the torque to be damped. Therefore, the damping cannot be achieved on its own with the hardware already existing in an installation.

In the mentioned methods, there is the additional problem that vibrations are impressed on the torque present at the generator as a result of the compensation processes themselves, and these vibrations generally result in a correspondingly non-uniform electrical output power.

There is therefore a need for solutions which make it possible to continuously determine a torque, in particular in a drive train, on the basis of variables which are already determined, generally by means of existing hardware, and back-control (closed-loop) by means of adjusting a generator torque. In addition, there is a requirement for solutions for smoothing vibration-related fluctuations in the output power of such generators.

SUMMARY

Against this background, the present disclosure provides a method for damping torsional vibrations in an energy generation installation and a device, in particular a closed-loop control device of an energy generation installation, having the features of the disclosure. Advantageous developments are the subject matter of the dependent claims and the description below.

On the basis of the proposed measures, the present disclosure provides solutions for at least the three abovementioned problems:

First, the torque to be damped or compensated for is determined more precisely and fed directly to the controller, as a result of which greater accuracy is achieved in comparison with speed-based damping methods.

The determination of the torque can also take place without any additional sensors, purely by means of the sensor equipment already existing in the installation and with the additional use of computation models.

The fluctuations in the generator output power arising in this method can ultimately be smoothed by a damping device before the electrical energy generated is fed to the power supply system.

In energy generation installations, the speed on the input drive and/or output drive side is generally known. On the input drive side, for example in the case of the rotor of a variable-speed wind energy installation, this speed is recorded by speed sensors and transmitted to the installation controller, which controls, by means of open-loop or closed-loop control, the operation of the installation on the basis of this value. On the generator side, the speed can be derived from electrical variables in the generator if it is not likewise determined via a speed sensor. In some installations, it is conventional to determine the speed only on the generator side and to feed this speed to the open-loop or closed-loop installation control.

In the context of this application, "rotor" should be understood to mean that part of an energy generation installation which is subjected to and driven by, for example, water or wind. The mobile part of the generator, on the other hand, is denoted by the term "armature".

In both cases, advantageously the torque can be determined from the variables known in the installation, wherein the accuracy of the determined torque is greater if the rotor speed is also measured in addition to the generator speed. A determination merely via the generator speed, on the other hand, enables a particularly quick and simple implementation without an additional sensor in corresponding installations. Both variants are based on the principle of determining the rotation angle between the input drive side and the output drive side continuously or time-discretely and from this determine the torque which is present in the drive train via a corresponding computation model. The advantageously used computation model is based on the equations of motion of a two-mass torsional vibration system. The rotation angle can in this case be obtained from the speeds on the rotor and generator side.

If only the speed on the generator side is known, a conclusion can be drawn on the rotor-side angular position by means of this speed and the torque present at the generator and therefore the rotation angle can likewise be determined. This can advantageously likewise take place by means of a computation model which is based on the equations of motion of a two-mass rotational vibration system.

Undesirable high-frequency or low-frequency vibrations which cannot be damped or are not intended to be damped and should therefore not be used as an input for the damping controller can be suppressed by filters. The installation torque is supplied to the damping controller by the superordinate installation controller, and said damping controller determines from this and from the determined torque the actuating torque for the generator, which can then be adjusted via the corresponding power electronics. In this way, an actuating torque can be generated with a high degree of accuracy without the use of additional sensor technology being necessary.

Expediently, in the case of closed-loop control of the generator according to the disclosure, one or more types of limitation are monitored. For example, it is possible to monitor the event of a maximum generator power $P=M \cdot \omega$ not being exceeded by the controller intervention. In addition, monitoring by means of which a power variation over time is limited (dP/dt limitation) is also conceivable. Likewise expedient is a limitation of the generator torque M and/or of the generator torque variation dM/dt.

Furthermore, the disclosure solves the problem of the fluctuating output power in a particularly advantageous manner by virtue of a damping device being connected upstream of the feed point to the power supply system. In this regard, an intermediate circuit capacitor of the DC voltage intermediate circuit and/or further electrical or mechanical energy stores can be used which can be connected in parallel with the intermediate circuit capacitor or other components of the drive train. In this case, the intermediate circuit voltage can be variable or kept constant.

By virtue of this method, it is possible to avoid a situation in which undesirable vibrations are impressed on the electricity system or on a connected load. In addition, the proposed solution can be used for positively influencing further installation variables which are coupled directly or indirectly to the torque, such as, for example, for damping lateral tower vibrations in a wind energy installation and/or for reducing loads in the rotor blades.

Further advantages and configurations of the disclosure result from the description and the attached drawing.

It goes without saying that the features mentioned above and yet to be explained below can be used not only in the respectively given combination, but also in other combinations or on their own, without departing from the scope of the present disclosure.

BRIEF DESCRIPTION OF THE DRAWINGS

The disclosure is illustrated schematically using exemplary embodiments in the drawings and will be described in detail below with reference to the drawings.

FIG. 3 shows graphs illustrating the method according to the disclosure in accordance with particularly preferred embodiments of the disclosure in comparison with the prior art.

DETAILED DESCRIPTION

Figure 1:
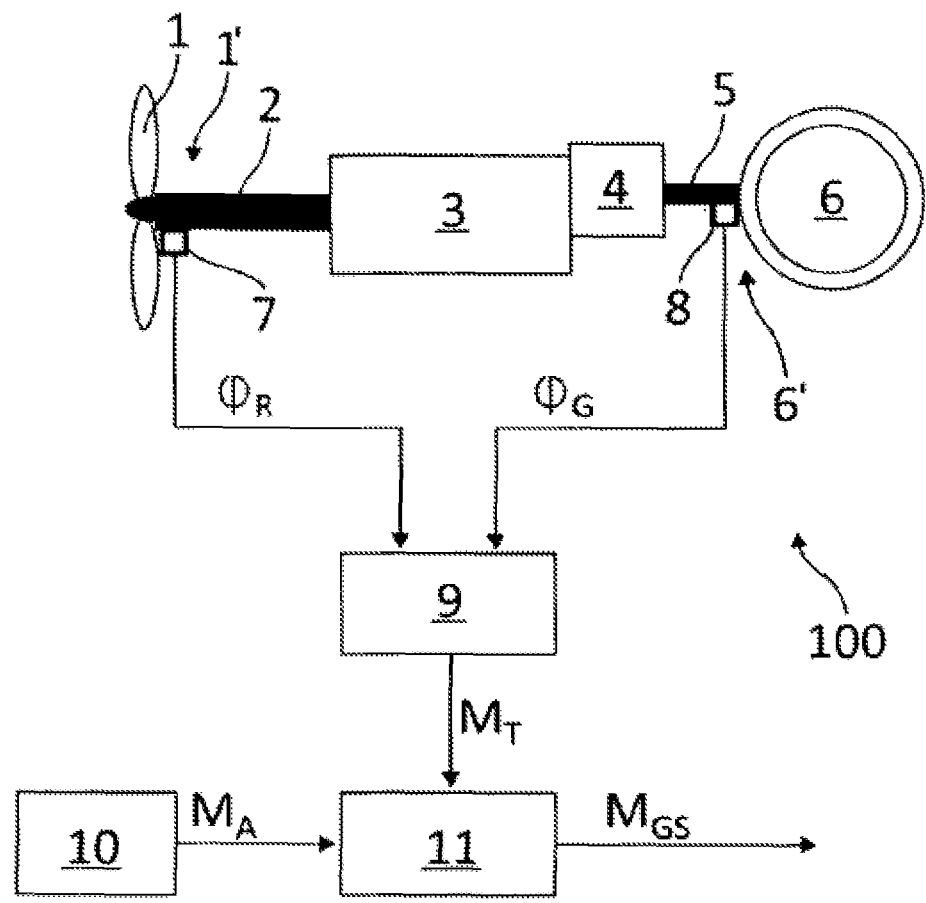
FIG. 1 shows an energy generation installation in accordance with a particularly preferred embodiment of the disclosure.

FIG. 1 shows the basic design 100 of a device for implementing an associated method in accordance with a particularly preferred embodiment of the disclosure, in which case an angular position on the rotor and generator side is determined.

The following are illustrated: a rotor 1 and a generator 6 of a wind energy installation, which are connected to one another mechanically by a drive train 2-5 consisting of a rotor output drive shaft 2, a gear 3, a clutch 4 and a generator input drive shaft 5. The rotor is fitted to a rotor-side end 1' of the drive train 2-5, and the generator is fitted to a generator-side end 6'. Two position encoders 7, 8 on the rotor side 1' and the generator side 6' determine the angular positions $f_R$ (rotor 1) and $f_G$ (generator 6) which are used in a model 9 of the drive train 2-5. The model 9 can in particular simulate the stiffness of the drive train and can be based on an estimation or a measurement.

By way of example, the torque $M_T$ is determined from a stiffness characteristic or a known stiffness c of the system in the model 9, omitting damping terms using the equation $M_T = c \cdot \Delta\phi$ from the measured angular difference $\Delta\phi$, wherein this torque $M_T$, together with a setpoint installation torque $M_A$ originating from a superordinate closed-loop installation control 10, represents an input for a damping controller 11, in which the actuating signal for the generator 6 $M_{GS}$ is generated. In this case, for example, the difference $M_A - M_T$ is given to a controller, for example a P controller, and this intensified control deviation is in turn added to $M_A$ (controller with feedforward control).

Figure 2:
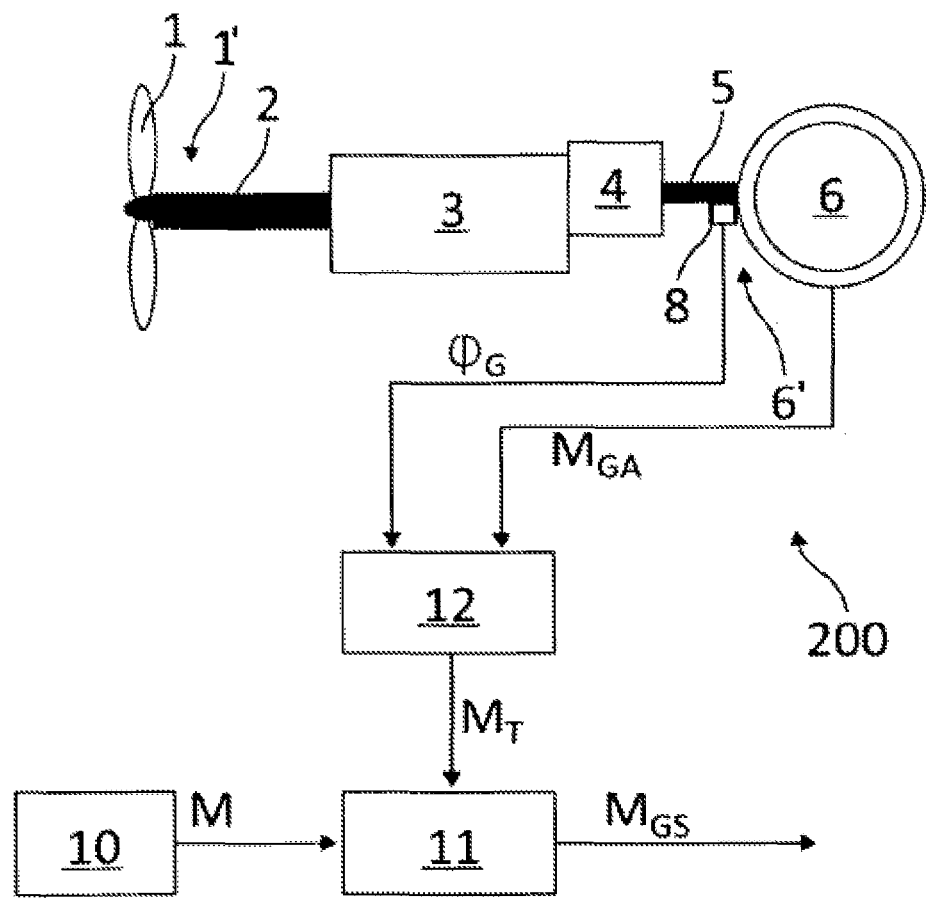
FIG. 2 shows an energy generation installation in accordance with a further preferred embodiment of the disclosure.

FIG. 2 shows the basic design 200 of a device for implementing an associated method in accordance with a further preferred embodiment of the disclosure, wherein in this case, however, only the angular position at the generator 6 is known or is determined. Identical or functionally identical elements to those in FIG. 1 are denoted by identical reference symbols and will not be explained again for reasons of clarity.

In the context of this embodiment, the generator torque $M_{GA}$, in addition to the generator angular position $f_G$, is input to a correspondingly matched installation model 12, in which the rotor angle $f_R$ and, with the aid of this, then the torque $M_T$ can be determined internally. The installation model 12 can have a two-mass vibration system model of the drive train. The acceleration of the generator (derivative of the generator speed) and the present generator torque $M_{GA}$ are used to draw a conclusion on the acceleration of the rotor on the basis of the model via a known stiffness and known mass ratios. By virtue of double integration, the angles at both ends and therefore the angle difference $\Delta\phi$ are produced. In this case too, the determination of the torque $M_T$ is therefore based on two angular position values, namely a generator angular position $f_G$ and a rotor angular position $f_R$, wherein, however, the rotor angular position $f_R$ is determined from the generator torque $M_{GA}$ in the installation model 12. The torque $M_T$ is used, together with the setpoint installation torque $M_A$ originating from the superordinate closed-loop installation control 10, as an input to the damping controller 11, in which, in turn, the actuating signal for the generator $M_{GS}$ is generated.

Subfigures 3A, 3B, 3C and 3D in FIG. 3 show graphs 310-340 illustrating the method according to the disclosure in comparison with the prior art. In graphs 310 (FIG. 3A), 320 (FIG. 3B), 330 (FIG. 3C) and 340 (FIG. 3D), in each case a torque M in the gear (graph 310), a torque M determined from the angular positions (graph 320), a speed difference $\Delta n$ (graph 330) and a generator speed n (graph 340) are plotted on the y axes 312, 322, 332 and 342 over a time t of 10 s on the x axes 311, 321, 331 and 341.

FIG. 3A shows the time profile 313 of a torque which is actually present in the drive train, in the present example on the sun wheel of a three-stage gear mechanism with one planet stage and two spur stages, with this torque being influenced, as is clearly visible, by vibrations of approximately 2 Hz, corresponding to natural vibrations of the drive train. Further, lower-frequency vibrations, for example shading of the tower and natural vibrations of the tower, and high-frequency vibrations, as arise from meshing in the gear, are superimposed on the 2-Hz vibrations.

In contrast, FIG. 3B illustrates a torque 323 which is determined in accordance with a particularly preferred embodiment of the disclosure via a model from the rotation angle or from angular positions. The torque 323 demonstrates a virtually identical profile to the measured torque in the gear 313, but without the high-frequency components of the gear vibrations which are virtually completely filtered out by the integral nature of the angular positions with respect to the speeds 333. Since these high-frequency vibrations cannot be compensated for in any case, this signal is very useful for active damping control of the torsional vibrations.

FIG. 3C shows a time profile showing a speed difference 333 which is used in accordance with the prior art to compensate for vibrations. FIG. 3D shows an actual generator speed 343.

As can be seen from the combination of subfigures 3A to 3C, the torque 323 determined from the angular positions corresponds to the real torque in the gear much more precisely than the speed difference 333 used in accordance with the prior art, for example (see FIG. 3C). It therefore becomes clear that the torque 323 determined via the described method simulates the actually present torque 313 much better than the speed methods 333 and is therefore better suited as an input for control-engineering damping. The large discrepancies between the profile of the speed difference 333 of the rotor and the generator and the profile of the generator speed 343 with respect to the actual profile of the torque 313, however, result in the expectation that closed-loop control based on these signals, as corresponds to the prior art, is not capable of achieving the same quality as the closed-loop control via the angular positions.

Figure 4:
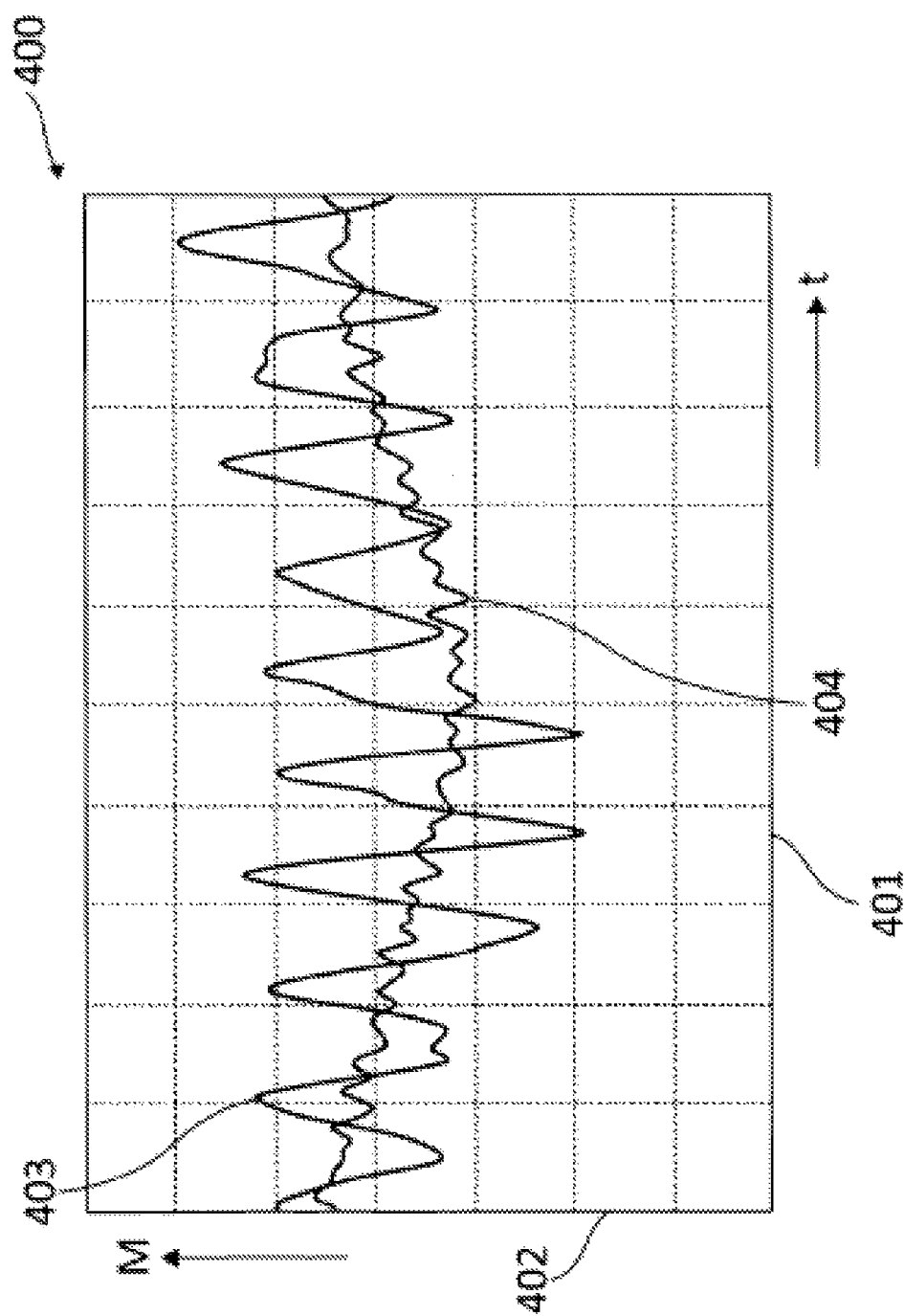
FIG. 4 shows a graph illustrating the method according to the disclosure in accordance with a particularly preferred embodiment of the disclosure in comparison with the prior art.

FIG. 4 illustrates, in the form of a graph 400, a torque 403 without damping and a torque 404 after damping in accordance with a particularly preferred embodiment in the form of a torque M on the y axis 402 over a time of 10 s on the x axis 401. As can be seen, a torque vibration is markedly reduced in comparison with the undamped state by means of the damping method in accordance with the preferred embodiment.

Figure 5:
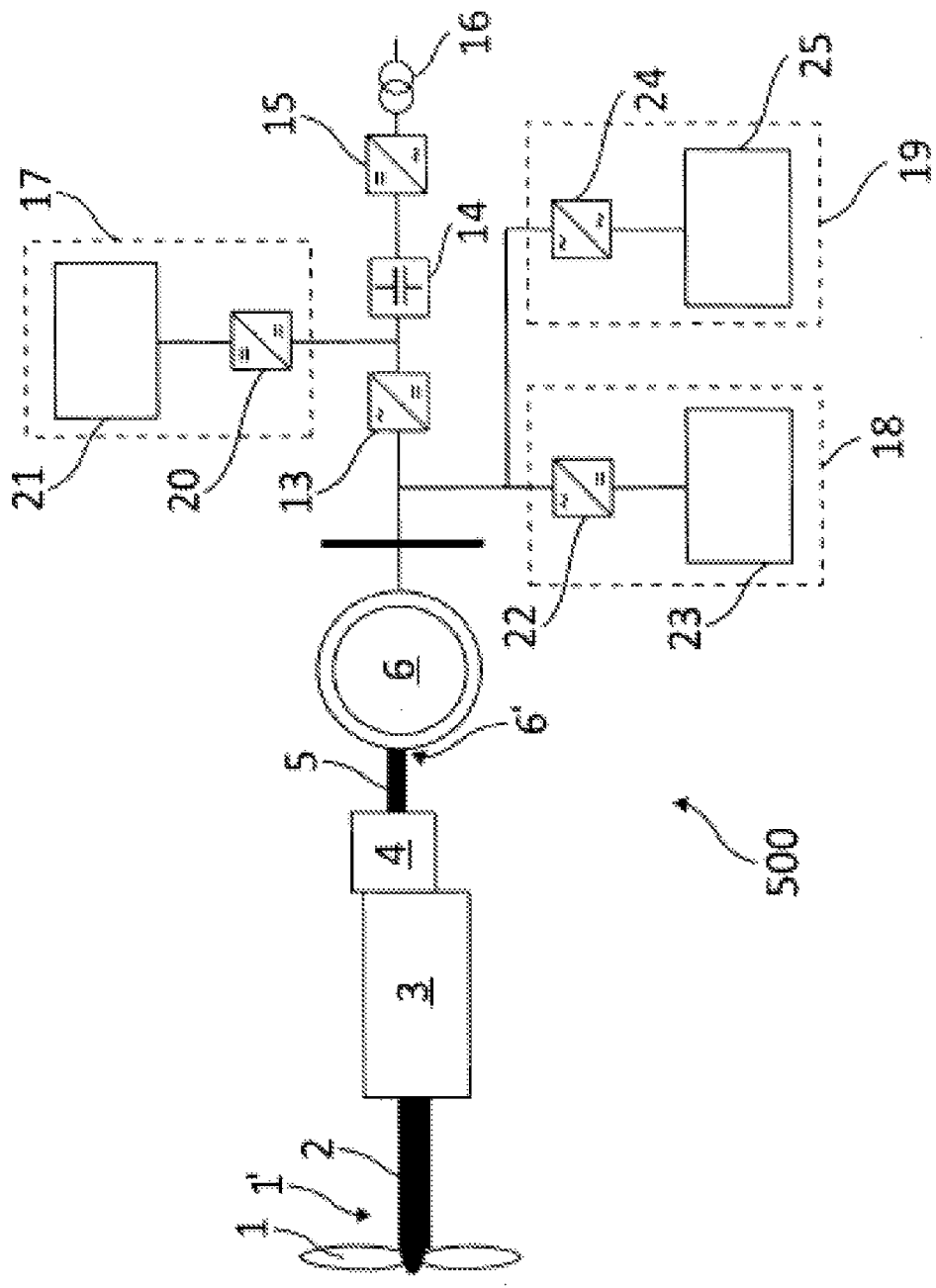
FIG. 5 shows an energy supply installation in accordance with a particularly preferred embodiment of the disclosure having means for smoothing a generator output power.

FIG. 5 shows the basic design 500 of a device for implementing an associated method in accordance with a particularly preferred embodiment of the disclosure, wherein possible, even alternative, embodiments with storage units 17, 18, 19 for smoothing the generator output power are illustrated. Identical or functionally identical elements to those in FIGS. 1 and 2 are denoted by identical reference symbols and will not be explained again for reasons of clarity.

For damping purposes, firstly even one intermediate circuit capacitor 14 of the DC voltage intermediate circuit can be used which is arranged between the generator-side rectifier 13 and the power supply system-side inverter 15 before the output voltage is transformed to the system voltage via the system transformer 16. The intermediate circuit capacitor 14 can in this case be designed for operation with a variable or with a constant DC voltage.

Alternatively or in addition to this, in accordance with preferred embodiments, further storage units 17, 18 and 19 with energy stores 21, 23 and 25 can be used. These storage units 17, 18 and 19 can in this case be used individually or else in any desired combination, in particular in the context of a cost-benefit analysis.

The storage unit 17 represents an embodiment of a damping system which is operated in parallel with the intermediate circuit. The damping system has a separate DC-to-DC converter 20 in order to provide the possibility of variable operating voltage of the DC store 21 and a variable power flow.

The storage unit 18 represents an embodiment of the damping system which is connected directly to the generator. In this case, coupling both to the stator and to the armature winding of the generator 6 is possible irrespective of the design of the main converter 13, 14 and 15. The three-phase current generated by the generator 6 is converted into a DC voltage of variable level via an AC-to-DC converter 22, for example a B6 rectifier. The storage of the damping energy is performed in a suitable DC store 32.

The storage unit 19 represents an embodiment of the damping system with likewise direct electrical coupling to the stator-side or rotor-side generator terminals. In contrast to storage unit 18, however, in this case an AC storage system 25 is provided which is fed via an AC-to-AC converter 24. Such a storage system can represent, for example, a flywheel which is coupled to an AC motor and which advantageously provides a relatively high power density.

The invention claimed is:

1. A method for damping torsional vibrations in an energy generation installation with including a drive train, a rotor fitted to a rotor-side end of the drive train, and a generator driven via the drive train and fitted to a generator-side end of the drive train, characterized in that, the method comprising:
    determining a first angular position of the drive train, the drive train operably connecting the rotor to the generator and having a generator-side end coupled to the generator and a rotor-side end coupled to the rotor, the first angular position being at the generator-side end of the drive train,
    determining a second angular position of the drive train at the rotor-side end of the drive train;
    separately feeding the determined first angular position and the determined second angular position to a computation model for determining a torque acting on the drive train; and
    using the determined torque from the computation model for closed-loop control of the generator.

2. The method as claimed in claim 1, wherein the first angular position of the drive train at its generator-side end is determined using a generator-side position encoder.

3. The method as claimed in claim 1, wherein the closed-loop control of the generator is performed whilst maintaining one or more of a power limitation and a power variation limitation.

4. The method as claimed in claim 1, wherein the torque is determined continuously or time-discretely.

5. The method as claimed in claim 1, wherein at least one energy storage device, which is connected to one or more of a DC voltage intermediate circuit, a generator armature, and a generator stator of the generator and has associated one or more of a DC-to-DC converter mechanism, an AC-to-DC converter mechanism, and an AC-to-AC converter mechanism, is provided for smoothing an output power of the generator.

6. The method as claimed in claim 1, further comprising:
    determining a setpoint generator torque from the torque, the setpoint generator torque being configured to drive the generator, and providing a setpoint torque by a closed-loop installation control.

7. The method as claimed in claim 6, wherein the setpoint generator torque is determined whilst maintaining one or more of a setpoint generator torque limitation and a setpoint generator torque variation limitation.

8. The method as claimed in claim 1, wherein the second angular position of the drive train at its rotor-side end is determined using a rotor-side position encoder or is derived via a model from different generator variables.

9. The method as claimed in claim 8, wherein the different generator variables are electrical generator torque and generator rotor angular position.

10. The method as claimed in claim 1, wherein a model simulating the energy generation installation is used to one or more of determine the torque and derive the angular position of the drive train.

11. The method as claimed in claim 10, wherein the model simulates the energy installation on the basis of a two-mass torsional vibration system.

* * * * *